(12) United States Patent
zur Loye et al.

(10) Patent No.: US 11,136,932 B2
(45) Date of Patent: Oct. 5, 2021

(54) CHARGE-FLOW ADJUSTMENT IN CLOSED-LOOP EXHAUST TEMPERATURE CONTROL ON DUAL FUEL ENGINES

(71) Applicant: CUMMINS INC., Columbus, IN (US)

(72) Inventors: Axel O. zur Loye, Columbus, IN (US); Christopher Pollitt, Okauchee, WI (US); Timothy P. Lutz, Zionsville, IN (US)

(73) Assignee: Cummins Inc., Columbus, IN (US)

( * ) Notice: Subject to any disclaimer, the term of this patent is extended or adjusted under 35 U.S.C. 154(b) by 932 days.

(21) Appl. No.: 15/537,146

(22) PCT Filed: Dec. 17, 2015

(86) PCT No.: PCT/US2015/066383
§ 371 (c)(1),
(2) Date: Jun. 16, 2017

(87) PCT Pub. No.: WO2016/100668
PCT Pub. Date: Jun. 23, 2016

(65) Prior Publication Data
US 2018/0003118 A1 Jan. 4, 2018

Related U.S. Application Data

(60) Provisional application No. 62/093,203, filed on Dec. 17, 2014.

(51) Int. Cl.
*F02D 41/14* (2006.01)
*F02D 41/00* (2006.01)
(Continued)

(52) U.S. Cl.
CPC ........ *F02D 41/1446* (2013.01); *F02B 37/183* (2013.01); *F02D 19/06* (2013.01);
(Continued)

(58) Field of Classification Search
CPC ............. F02D 41/1446; F02D 41/0025; F02D 41/2458; F02D 19/0605; F01N 3/28
See application file for complete search history.

(56) References Cited

U.S. PATENT DOCUMENTS

| | | | |
|---|---|---|---|
| 2,909,159 A | 10/1959 | Britton | |
| 5,123,246 A | 6/1992 | Younessi et al. | |

(Continued)

FOREIGN PATENT DOCUMENTS

| | | |
|---|---|---|
| WO | 2012/021061 | 2/2012 |
| WO | 2012/150468 | 11/2012 |
| WO | 2013/022630 | 2/2013 |

OTHER PUBLICATIONS

International Preliminary Report on Patentability received for PCT Patent Application No. PCT/US2015/066383, dated Jun. 29, 2017, 11 pages.
International Search Report and Written Opinion dated Mar. 31, 2016 in PCT/US2015/066383.

*Primary Examiner* — Ngoc T Nguyen
(74) *Attorney, Agent, or Firm* — Faegre Drinker Biddle & Reath LLP

(57) ABSTRACT

Methods and systems of controlling operation of a dual fuel engine are provided, comprising determining a target exhaust temperature, sensing an actual exhaust temperature, determining an exhaust temperature deviation by comparing the actual exhaust temperature to the target exhaust temperature, comparing the exhaust temperature deviation to a threshold, adjusting at least one of an intake throttle, a wastegate, a compressor bypass valve, an exhaust throttle, a VGT and engine valve timing when the exhaust temperature deviation exceeds the threshold to control charge-flow to the engine, and continuing the adjusting until the exhaust temperature deviation is less than the threshold.

14 Claims, 2 Drawing Sheets

(51) Int. Cl.
*F02B 37/18* (2006.01)
*F02D 9/04* (2006.01)
*F02D 41/40* (2006.01)
*F02D 23/00* (2006.01)
*F02D 19/06* (2006.01)
*F02D 41/24* (2006.01)

(52) U.S. Cl.
CPC ......... *F02D 19/0605* (2013.01); *F02D 23/00* (2013.01); *F02D 41/0002* (2013.01); *F02D 41/0007* (2013.01); *F02D 41/0025* (2013.01); *F02D 41/0082* (2013.01); *F02D 41/2422* (2013.01); *F02D 9/04* (2013.01); *F02D 41/0085* (2013.01); *F02D 41/401* (2013.01); *F02D 2041/001* (2013.01); *F02D 2200/0406* (2013.01); *F02D 2200/101* (2013.01); *F02D 2200/1002* (2013.01); *Y02T 10/12* (2013.01); *Y02T 10/30* (2013.01)

(56) References Cited

U.S. PATENT DOCUMENTS

| | | | |
|---|---|---|---|
| 5,303,168 | A | 4/1994 | Cullen et al. |
| 5,526,645 | A | 6/1996 | Kaiser |
| 5,983,876 | A | 11/1999 | Irons et al. |
| 6,236,908 | B1 | 5/2001 | Cheng et al. |
| 7,270,089 | B2 | 9/2007 | Wong |
| 7,913,673 | B2 | 3/2011 | Vanderslice et al. |
| 8,302,385 | B2 | 11/2012 | Sujan |
| 2003/0187565 | A1 | 10/2003 | Wong |
| 2004/0003805 | A1 | 1/2004 | Ono et al. |
| 2008/0066715 | A1 | 3/2008 | Jankovic |
| 2008/0078169 | A1 | 4/2008 | Shibashi |
| 2009/0301060 | A1* | 12/2009 | Kennie ............... F02D 41/1443 60/285 |
| 2011/0265454 | A1* | 11/2011 | Smith ................... F01N 13/011 60/274 |
| 2012/0055457 | A1 | 3/2012 | Wong et al. |

* cited by examiner

CHARGE-FLOW ADJUSTMENT IN CLOSED-LOOP EXHAUST TEMPERATURE CONTROL ON DUAL FUEL ENGINES

RELATED APPLICATIONS

The present application is a United State National Stage application under 35 U.S.C. § 371 of International Application No. PCT/US2015/066383, titled "CHARGE-FLOW ADJUSTMENT IN CLOSED-LOOP EXHAUST TEMPERATURE CONTROL ON DUAL FUEL ENGINES," filed on Dec. 17, 2015, which in turn claims priority to Provisional Patent Application No. 62/093,203, filed with the United States Patent and Trademark Office on Dec. 17, 2014, the entire disclosures of which are both expressly incorporated herein by reference.

TECHNICAL FIELD

The present disclosure relates generally to dual fuel engines and more particularly to systems and methods for controlling air flow of the engines to achieve a target exhaust temperature and thereby improve engine performance.

BACKGROUND OF THE DISCLOSURE

Dual fuel engines burn diesel fuel and natural gas simultaneously in an air-fuel mixture. The gas and air are typically mixed upstream of the engine cylinders and then are drawn into the engine cylinders. For each cylinder, near the end of the compression stroke, diesel fuel is injected. When the diesel fuel compression ignites, it causes the natural gas to also burn. The combined combustion releases energy that powers the engine. The air-fuel ratio of the mixture has a direct impact on the performance of the engine. If the air-fuel ratio is too rich, then the thermal limits of the engine may be exceeded, or the combustion may be too fast, causing excessive cylinder pressures or engine knock, which may cause engine damage. If the air-fuel ratio is too lean, then combustion of the natural gas-air mixture may be incomplete, reducing the overall efficiency of the engine and increasing the undesirable emissions such as unburned hydrocarbons.

The optimal air-fuel ratio depends upon several highly variable parameters including the current engine speed, current load, the quality of the natural gas, the temperature and humidity of the intake air and the ambient pressure (i.e., altitude). Methods exist for directly controlling the air-fuel ratio by measuring at least some of these variable parameters and adjusting the air-fuel ratio to account for the variations yet still provide the desired engine performance. In general, such approaches are complex and expensive to implement. Accordingly, an alternative approach to controlling the performance of a dual fuel engine is desirable.

SUMMARY OF THE DISCLOSURE

In one embodiment, the present disclosure provides systems for controlling operation of a dual fuel engine, comprising a sensor configured to measure an exhaust temperature, a processor in electrical communication with the sensor, and a non-transitory memory having instructions that, in response to execution by the processor, cause the processor to determine a target exhaust temperature, receive a measured exhaust temperature from the sensor, determine an exhaust temperature deviation by comparing the measured exhaust temperature to the target exhaust temperature, compare the exhaust temperature deviation to a threshold, adjust at least one of a diesel injection start of injection, a rail pressure, an intake throttle, a wastegate, a compressor bypass valve, an exhaust throttle, a variable geometry turbocharger and engine valve timing when the exhaust temperature deviation exceeds the threshold to control charge-flow to the engine, and repeatedly adjust until the exhaust temperature deviation is less than the threshold. In one aspect of this embodiment, determining a target exhaust temperature includes accessing a lookup table including predetermined associations between target exhaust temperatures and at least one of current engine power and current engine speed. In another aspect, the engine includes a first bank of cylinders and a second bank of cylinders, and adjusting includes separately controlling charge-flow to each of the banks of cylinders to balance operation of the banks of cylinders. As used herein, the balancing of the operation of the bank of cylinders is not particularly limited and may be understood to include at least balancing power output, temperatures, pressures (e.g., manifold pressure, cylinder pressure, etc.). In another variant, the engine includes a first bank of cylinders and a second bank of cylinders, and adjusting includes separately controlling charge flow to each of the banks of cylinders to balance one of exhaust temperatures of the banks and intake manifold pressures of the banks.

According to another embodiment, the disclosure provides a method of controlling a dual fuel engine with at least two banks of cylinders, comprising sensing temperatures of exhaust from the at least two banks, and adjusting a gas flow to one of the at least two banks to balance exhaust temperatures of the at least two banks. In a variant of this embodiment, the method further includes lowering the gas flow to one of the at least two banks while increasing the gas flow to the other of the at least two banks by a similar amount to maintain a substantially constant total gas flow to the engine. As used herein, the term "sensing" is not particularly limited and may include the use of physical sensors, virtual sensors (e.g., calculations from physical sensors elsewhere), or mixtures thereof.

In another embodiment, methods of controlling a dual fuel engine with at least two banks of cylinders, comprising sensing at least one of temperatures of exhaust from the at least two banks and a pressure of an intake manifold of each of the at least two banks, and adjusting at least one of a gas flow to one of the at least two banks to balance exhaust temperatures of the at least two banks, a charge flow to one of the at least two banks to balance exhaust temperatures of the at least two banks, or an air flow to one of the at least two banks to balance exhaust temperatures of the at least two banks and intake manifold pressures of the at least two banks are provided.

In yet another embodiment, the disclosure provides a method of controlling a dual fuel engine with at least two banks of cylinders, comprising sensing a pressure of an intake manifold of each of the at least two banks, adjusting a gas flow to one of the at least two banks, and adjusting an air flow to one of the at least two banks to balance exhaust temperatures of the at least two banks and intake manifold pressures of the at least two banks.

Also disclosed are various systems for controlling operation of a dual fuel engine, comprising a sensor configured to measure an exhaust temperature, a processor in electrical communication with the sensor, and a non-transitory memory having instructions that, in response to execution by the processor, cause the processor to determine a target exhaust temperature, receive a measured exhaust temperature from the sensor, determine an exhaust temperature deviation by comparing the measured exhaust temperature to the target exhaust temperature, compare the exhaust temperature deviation to a threshold, adjust at least one of a diesel injection start of injection, a rail pressure, an intake throttle, a wastegate, a compressor bypass valve, an exhaust throttle, a variable geometry turbocharger and engine valve timing when the exhaust temperature deviation exceeds the threshold to control charge-flow to the engine, and repeatedly adjust until the exhaust temperature deviation is less than the threshold.

In various embodiments, dual fuel engines may switch from two banks to single bank operation. In some embodiments, the switching may be accompanied by deactivating engine valves on the non-fueled bank. In various embodiments this may be accomplished by adjusting the intake throttle, wastegate, compressor bypass, or variable geometry turbocharger ("VGT") to desired positions, for example, to limit air flow through the non-fueled bank.

BRIEF DESCRIPTION OF THE DRAWING

Embodiments of the present disclosure will now be described, by way of example only, with reference to the accompanying drawing, in which.

Figure 1:
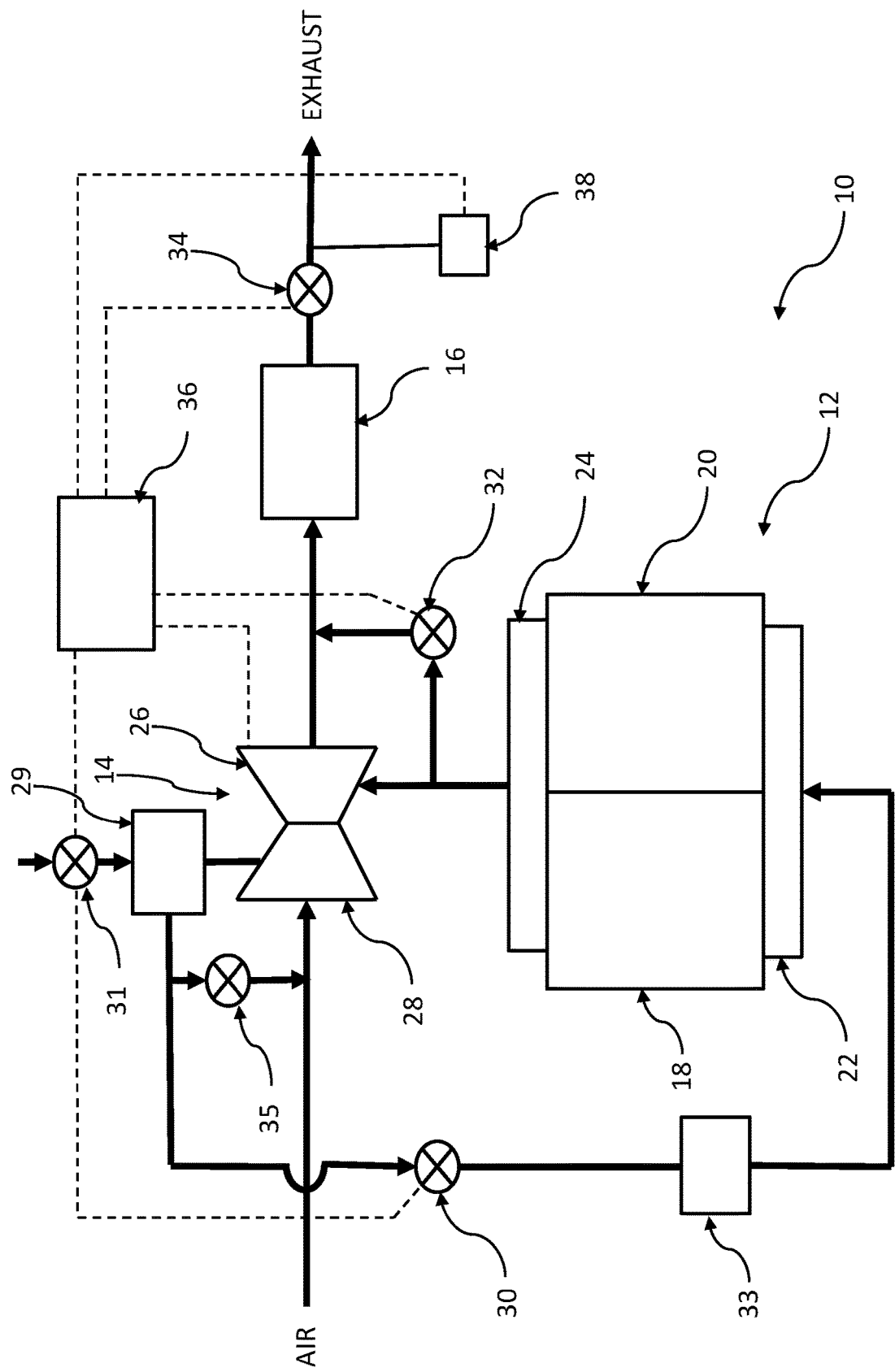
FIG. 1 is a conceptual diagram of a dual fuel engine system.

While the disclosure is amenable to various modifications and alternative forms, specific embodiments have been shown by way of example in the drawings and are described in detail below. The disclosure, however, is not to limit the invention to the particular embodiments described. On the contrary, the invention is intended to cover all modifications, equivalents, and alternatives falling within the scope of the invention as defined by the appended claims.

DETAILED DESCRIPTION OF EMBODIMENTS OF THE DISCLOSURE

Referring now to FIG. 1, a dual fuel engine system 10 is shown. System 10 generally includes an engine 12, a turbocharger 14 and an after-treatment system 16. In some embodiments of the present disclosure, engine 12 includes a first bank of cylinders 18 and a second bank of cylinders 20. Hereinafter, the term "bank" shall refer to a subset of cylinders of the engine. One example of such an embodiment is a V-type engine wherein a plurality of cylinders are disposed in one bank 18 and a plurality of cylinders are disposed in a second bank 20. A second example of such an embodiment is an in-line engine where two or more subsets of the engine (e.g., three cylinders on a six cylinder engine) have independent intake systems. In any case, as described below, the principles of the present disclosure provide the opportunity to separately control the air flow and the gas flow to a certain subset of cylinders. Typically, the subset is one bank, but in other applications it is possible, for example, to have two turbochargers on an in-line six cylinder engine. The present disclosure permits independent control of air flow to each of banks 18 and 20 as is further described below. Engine 12 further includes an air intake manifold 22 which provides air to the engine cylinders and an exhaust manifold 24 which routes exhaust from the engine cylinders. In other embodiments, each bank of cylinders has its own intake manifold and each bank further includes its own exhaust manifold.

Turbocharger 14 generally includes a turbine 26 which is powered by exhaust from exhaust manifold 24 and a compressor 28 which is coupled to rotate with turbine 26 to compress intake air to be provided to intake manifold 22 in a manner known in the art. Natural gas is typically introduced into a mixer 29 that can be located upstream of compressor 28, or between compressor 28 and the cylinder head. Alternatively, the gas may be delivered directly into the intake ports of the cylinders or directly into the cylinders with a gas injector (not shown). In one embodiment of the present disclosure, turbocharger 14 is a variable geometry turbocharger ("VGT"). As is known in the art, after-treatment system 16 may include any of a variety of components configured to process the exhaust from engine 12 in a manner that reduces the undesirable emissions from system 10, including but not limited to oxidation catalysts, selective catalytic reduction ("SCR") systems, NOx absorbers and particulate traps or filters.

In general, intake air (ambient or fresh air) is provided to turbocharger compressor 28. Under power of turbine 26, compressor 28 increases the pressure and total volume of air provided to intake manifold 22. The exhaust from engine 12 is provided to turbine 26 to power compressor 28 and provide the increased pressure described above. Ultimately, the exhaust from engine 12 is treated by after-treatment system 16 and discharged into the environment.

Dual fuel engine system 10 also includes an intake air throttle 30, shown in FIG. 1 in between compressor 28 and a charge air cooler 33, which is in flow communication with intake manifold 22. In various embodiments, dual engine system 10 may not utilize charge air cooler 33. Air intake throttle 30 may be controlled to adjust the amount of air provided to intake manifold 22. In some engine configurations, intake throttle 30 may be located upstream of compressor 28. Many different throttle configurations may be used, such as a butterfly valve or other valve type. System 10 also may include a turbine bypass or wastegate valve 32 in an exhaust flow path around turbine 26. Wastegate 32 may be controlled to adjust the amount of exhaust provided to turbine 26 by adjusting the amount of exhaust that bypasses turbine 26. Adjustment of wastegate 32 thus affects the speed of turbine 26 and therefore the pressure (and amount) of air provided by compressor 28 (through intake air throttle 30) to intake manifold 22. Again, many different throttle configurations may be used for wastegate 32.

System 10 may further include an exhaust throttle 34. As with the other throttles or valves mentioned above, exhaust throttle 34 may be of any of a variety of different configurations which control the amount of exhaust gas that is released from engine 12. While exhaust throttle 34 is depicted as being downstream of after-treatment system 16, it should be understood that throttle 34 may be located at any of a variety of different locations downstream of turbine 26, upstream, within, or downstream of after-treatment system 16. Adjustment of exhaust throttle 34 affects the air flow to engine 12 by providing an additional restriction in the exhaust flow. Other exemplary methods of altering the efficiency of the engine 12 includes closing the intake throttle 30. Closing exhaust throttle 34 typically reduces the efficiency of engine 12, which further increases the temperature of the exhaust. It should also be understood that each of intake throttle 30, wastegate 32 and exhaust throttle 34 are optional. The teachings of the present disclosure apply to systems 10 having one or more of these components.

Intake throttle 30, wastegate 32 and exhaust throttle 34 are each controlled by controller 36 (e.g., an engine control module or "ECM"). In certain embodiments, the controller 36 forms a portion of a processing subsystem including one or more computing devices having memory, processing, and communication hardware. The controller 36 may be a single device or a distributed device, and the functions of the controller may be performed by hardware and/or as computer instructions on a non-transient computer readable storage medium.

In certain embodiments, the controller 36 includes one or more determiners that functionally execute the operations of the controller. The description herein including determiners emphasizes the structural independence of certain aspects of the controller 36, and illustrates one grouping of operations and responsibilities of the controller. Other groupings that execute similar overall operations are understood within the scope of the present application. Determiners may be implemented in hardware and/or as computer instructions on a non-transient computer readable storage medium, and may be distributed across various hardware or computer based components.

Example and non-limiting implementation elements that functionally execute the operations of the controller include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

In various embodiments, the processing hardware can include a processor in electrical communication with the sensor. In various embodiments controller 36 may also include non-transitory memory hardware having instructions that, in response to an execution by the processor, cause the processor to determine a target exhaust temperature, sense an actual exhaust temperature, determine an exhaust temperature deviation by comparing the actual exhaust temperature to the target exhaust temperature, compare the exhaust temperature deviation to a threshold, adjust at least one of a diesel injection start of injection, a rail pressure, an intake throttle, a wastegate, a compressor bypass valve, an exhaust throttle, a variable geometry turbocharger and engine valve timing when the exhaust temperature deviation exceeds the threshold to control charge-flow to the engine, and continually adjust until the exhaust temperature deviation is less than the threshold.

Additionally, in engine systems wherein turbocharger 14 is a VGT, controller 36 may adjust the aspect ratio of turbocharger 14 to control the amount of air provided by compressor 28. Controller 36 may also be used to alter the timing of the intake and exhaust valves of the cylinders in banks 18, 20 as another technique for controlling air flow through engine 12. Adjustment of any of these components (i.e., intake throttle 30, wastegate 32, exhaust throttle 34, turbocharger 14, or the cylinder valves) results in a change in the amount of air flowing through engine 12. Each of these components is hereinafter referred to as a "charge-flow adjustor." Control of the flow through any or all of these charge-flow adjustors is hereinafter referred to as "charge-flow adjustment."

System 10 further includes one or more exhaust temperature sensors 38. Sensor 38 may be located at any of a variety of different stages of after-treatment system 16 or other locations relative to exhaust throttle 34 to sense the temperature of exhaust. In the embodiment shown, sensor 38 is depicted as sensing the exhaust temperature downstream of exhaust throttle 34. Sensor 38 could also be placed upstream of turbine 26, for example at the inlet of turbine 26, or there could be multiple exhaust temperature sensors in the exhaust ports of the individual cylinders of engine 12. In such an implementation, the exhaust temperatures at each exhaust port in a bank may be averaged, and the average exhaust port temperature may be compared to the target exhaust temperature described herein. Any charge-flow adjustment described above results in a change in exhaust temperature. According to the principles of the present disclosure, exhaust temperature may be controlled to a target exhaust temperature (or temperature range) through closed-loop charge-flow adjustment. More specifically, controller 36 may monitor the exhaust temperature provided by sensor 38 and, based on a current power target and/or speed target of engine 12, compare the sensed exhaust temperature to a target exhaust temperature. When the sensed exhaust temperature deviates from the target exhaust temperature by an amount exceeding a threshold deviation, controller 36 causes a charge-flow adjustment by controlling one or more of the charge-flow adjustors to drive the exhaust temperature toward the target exhaust temperature. Controller 36 may be configured to continuously minimize the deviation or "error" of the sensed exhaust temperature from the target exhaust temperature using a closed-loop control scheme such as one implemented by a PID controller. It has been determined that by controlling to a target exhaust temperature in this manner, the resulting charge-flow of engine 12 is maintained in an optimal range for the current engine system operating conditions, thereby resulting in improved fuel efficiency and reduced emissions without having to account for the variability introduced by humidity, fuel quality, intake air temperature, altitude, etc.

In one embodiment the target exhaust temperature is a fixed temperature. In other embodiments the target exhaust temperature changes based on, for example, a look-up table including other engine operational parameters. For example, during normal operation in many embodiments, controller 36 receives or computes a power target and/or a speed target for engine 12, both of which determine the total fuel energy to be provided to engine 12 as the engine load and/or operating conditions change. Controller 36 may periodically access a look-up table containing predetermined associations between power and/or speed targets and target exhaust temperatures. In this manner, controller 36 may determine the current target exhaust temperature based on the current engine operating conditions. It should be understood that controller 36 may also take into account the temperature of air/gas at intake manifold 22 when determining the target exhaust temperature to compensate for cold engine operation.

By controlling to a target exhaust temperature through charge-flow adjustment in the manner described above, the present disclosure may provide particularly improved engine performance under low load conditions. In diesel engines, the air-fuel ratio is very high under low load conditions (e.g., greater than 50:1). This is particularly disadvantageous in dual fuel engines because when the mixture is so lean, only the gas molecules near the diesel fuel in the combustion chamber will burn. Consequently, the fuel efficiency of the engine becomes very low and the unburned carbon emissions become very high. In typical dual fuel engine applications, the gas supply to the engine is shut off under such low load conditions (e.g., 25% load or less) to avoid this unacceptable performance. Using the principles of the present disclosure, however, as a result of controlling to a target exhaust temperature, at low loads the total air flow to engine 12 is reduced, which reduces the air-fuel ratio (i.e., provides a richer ratio). Consequently, more of the gas in the chambers will burn and the overall performance (fuel efficiency and emissions) of the engine is improved. Moreover, reducing the air flow at low loads increases the exhaust temperatures which may allow after-treatment system 16 to function more efficiently, further lowering the emissions of system 10.

In one embodiment of the present disclosure for use in V engine applications, the principles described above are used to balance the operation of first bank 18 of cylinders and second bank 20 of cylinders. In dual fuel engines, the quantity of fuel provided to each bank of cylinders in a V engine may be different causing an imbalance in performance of the two banks, which is undesirable for a variety of reasons. In this embodiment, exhaust temperature may be determined (e.g., measured at the outlet of each bank 18, 20 at exhaust manifold 24). In situations where the exhaust temperature from bank 18, for example, is greater than the exhaust temperature of bank 20, controller 36 may reduce the amount of gas provided to bank 18 and/or increase the amount of air provided to bank 18 relative to the gas and air provided to bank 20. For example, in V16 engines where each bank includes a turbocharger, typically one mixer is provided per turbocharger. The natural gas flow is controlled with a gas flow control valve 31 upstream of mixer 29. A compressor bypass valve 35 may be positioned between the output of mixer 29 and the input of compressor 28. In such an embodiment, two gas flow control valves 31 are provided, one per bank of cylinders, and controller 36 may adjust not only the total gas flow, but also the gas flow separately for each bank. In embodiments with more than two banks (e.g., a V16 engine), the engine could be divided into four quadrants, with four cylinders per quadrant. Here, one could implement four turbochargers and four mixers to permit control of four independent "banks." Alternatively, controller 36 may increase the gas and/or air provided to bank 20. In this manner, the operation of banks 18, 20 may be balanced thereby improving the performance of engine 12. One way of balancing the banks is to increase the gas flow to the bank with a lower exhaust temperature (and lower the gas flow to the other bank) to keep the total fuel flow to engine 12 the same. For the bank that is colder, the air flow may be reduced, which will increase the exhaust temperature of that bank. In one embodiment, the air flow is adjusted to match the intake manifold pressure (measured downstream of intake throttle 30). Then, the relative natural gas flow to the banks is adjusted to balance the exhaust temperatures in the two exhaust systems.

Also according to the principles of the present disclosure, controller 36 may simultaneously control to a target exhaust temperature by adjusting the overall air flow to engine 12, balance the operation of banks 18, 20 by adjusting the gas flow to the individual banks 18, 20 to achieve balanced exhaust temperatures from the banks, and balance the boost pressure of the banks 18, 20 by adjusting the amount of air provided to each bank 18, 20.

As indicated above, there are many different turbocharger, mixer and gas flow control valve arrangements. In order to balance the banks of a particular engine, controller 36 needs the ability to separately control air flow and/or gas flow to the banks. There are engines that have more than two turbochargers. For example, some engines have four turbochargers (two per bank). Such engines may have one gas flow control valve per bank, or one gas flow control valve per turbocharger (i.e., two per bank). In such an embodiment, controller 36 would synchronize the operation of the two valves per bank to balance the banks. Regardless of the arrangement of the gas flow control valves and the charge flow control devices, the key for bank to bank balancing is the ability to separately adjust the charge flow and/or the gas flow to the two banks. In systems having more than two banks, the natural gas flow and/or charge-flow may be adjusted for each of the more than two banks according to the principles of the present disclosure.

In some engine applications, controller 36 can only adjust one of either gas flow or charge flow separately per bank. For example, if the engine has only one gas flow control valve, but has an intake throttle on each bank, then the operation of the banks is balanced by varying the position of the two intake throttles. Similarly if the two banks share one after-treatment system with a single exhaust throttle, the banks may be balanced if there are two gas flow control valves. It should be understood, however, that even if there is no way to control the charge flow, the operation of the banks may still be balanced by adjusting the gas flow to the two banks.

Moreover, in various embodiments, the feedback used to control of airflow is not particularly limited. For example, the feedback used may be the difference between the actual temperature and a target temperature and, thus, the difference may be kept within a desired target temperature range.

In a system with one charge flow control device per bank and one gas flow control valve per bank, controller 36 can control to an overall target exhaust temperature, balance the exhaust temperatures of the two banks and balance the intake manifold pressures on both banks. The number of parameters that may be varied is four, and the number of constraints is three (i.e., target exhaust temperature, balance exhaust temperatures, and balance intake manifold pressures). Thus, the system is under-constrained. In other words, one more constraint is needed to allow the control system to find the desired operating condition. In one embodiment the control system would have a target for the substitution rate, which it would typically get from a look up table based on several parameters, but primarily engine speed and engine load.

Figure 2:
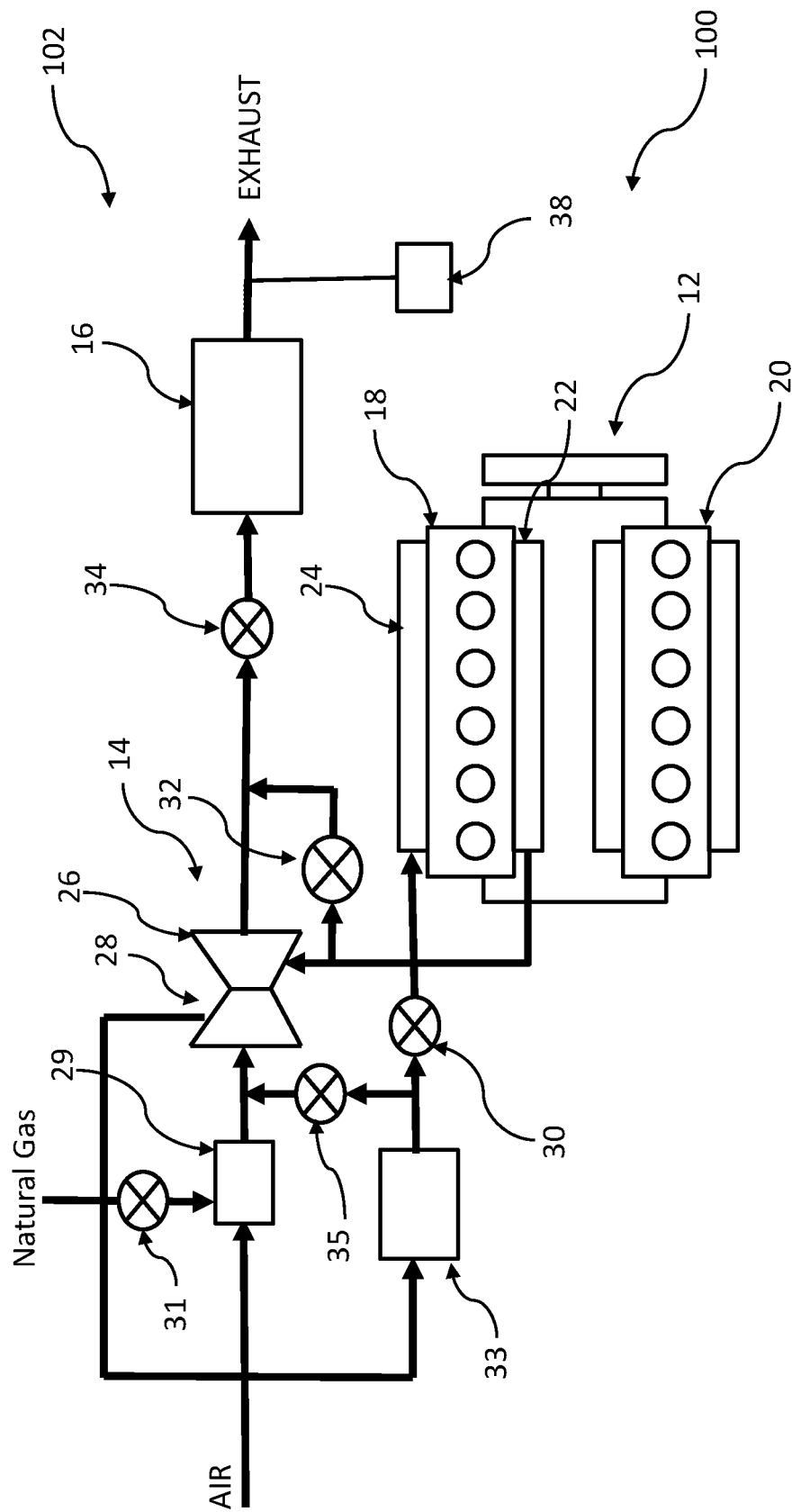
FIG. 2 is a conceptual diagram of another dual fuel engine system.

FIG. 2 depicts another dual fuel engine system 100. System 100 includes the same components as system 10 of FIG. 1. Therefore, the same reference designations are used. System 100 shows, among other things, one air/gas/exhaust system 102 for bank 18 of engine 12. A separate air/gas/exhaust system having the same components in the same configuration is provided for bank 20 of engine 12. For simplicity, the second air/gas/exhaust system is not shown. Also to simplify FIG. 2, controller 36 and its connections to the system components are not shown. In system 102, compressor bypass valve 35 takes charge-flow from downstream of charge air cooler 33 and upstream of intake throttle 30. Typically, compressor bypass valve 35 is an "anti-surge" device and will be ineffective at preventing compressor surge if the bypass air is taken from downstream of intake throttle 30. Intake throttle 30 is located downstream of charge air cooler 33 to prevent intake throttle 30 from being exposed to the higher temperature charge flow. Mixer 29 is located upstream of compressor 28 and upstream of the entry point for bypass flow from bypass valve 35 to compressor 28. This placement is provided because in system 102, the same air-fuel ratio is provided in both the flow exiting mixer 29 and the flow from compressor bypass valve 35 in steady-state operation. Finally, in system 102 exhaust throttle 34 is located upstream of after-treatment system 16. When exhaust throttle 34 is restricted or closed, pressure increases upstream of the throttle. By locating exhaust throttle 34 upstream of after-treatment system 16, after-treatment system 16 does not experience such pressure increases and pulsations.

It should be further understood that according to the principles of the present disclosure, the total gas flow could be adjusted to match a targeted ratio of gas to diesel flow. This could be a ratio for mass flow, volume flow, or preferable energy flow. This would typically be measured using a "virtual sensor." Such virtual sensors are known to those skilled in the art. Typically, the diesel flow rate that is commanded by controller 36 (this parameter is almost always available in modern diesel engines) is used. One way to estimate the ratio of the diesel energy flow to the total fuel energy supplied to the engine is to first estimate the horsepower due to the diesel fuel (e.g., "diesel_hp"), a parameter typically provided by controller 36 and then to estimate the ratio of the diesel fuel energy flow to the total fuel energy flow as diesel_hp/total_fuel_hp. From that the ratio of diesel fuel energy to natural gas fuel energy can be calculated directly.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What is claimed is:

1. A method of controlling operation of a dual fuel engine burning a mixture of diesel fuel and a gaseous fuel, comprising:
    determining a target exhaust temperature;
    sensing an actual exhaust temperature of the burned mixture of diesel fuel and the gaseous fuel;
    determining an exhaust temperature deviation by comparing the actual exhaust temperature to the target exhaust temperature;
    comparing the exhaust temperature deviation to a threshold;
    adjusting at least one of a diesel injection start of injection, a rail pressure, an intake throttle, a wastegate, a compressor bypass valve, an exhaust throttle, a variable geometry turbocharger and engine valve timing when the exhaust temperature deviation exceeds the threshold to control charge- flow to the engine; and
    continuing the adjusting until the exhaust temperature deviation is less than the threshold.

2. The method of claim 1, wherein determining the target exhaust temperature comprises accessing a lookup table including predetermined associations between target exhaust temperatures and at least one of current engine power and current engine speed.

3. The method of claim 1, wherein the engine comprises a first bank of cylinders and a second bank of cylinders, and adjusting comprises separately controlling charge-flow to each of the banks of cylinders to balance operation of the banks of cylinders.

4. The method of claim 1, wherein the engine comprises a first bank of cylinders and a second bank of cylinders, and adjusting comprises separately controlling charge flow to each of the banks of cylinders to balance one of exhaust temperatures of the banks and intake manifold pressures of the banks.

5. The method of claim 4, further comprising lowering a first flow of the gaseous fuel to one of the first and the second banks while increasing a second flow of the gaseous fuel to the other of the first and the second banks to maintain a constant total gaseous fuel flow to the engine.

6. The method of claim 1, wherein sensing the actual exhaust temperature comprises sensing the actual exhaust temperature with a virtual sensor.

7. A system for controlling operation of a dual fuel engine burning a mixture of diesel fuel and a gaseous fuel, comprising:
    a sensor configured to measure an exhaust temperature of the burned mixture of diesel fuel and the gaseous fuel;
    a processor in electrical communication with the sensor; and
    a non-transitory memory having instructions that, in response to execution by the processor, cause the processor to
    determine a target exhaust temperature;
    receive a measured exhaust temperature of the burned mixture of diesel fuel and the gaseous fuel from the sensor;
    determine an exhaust temperature deviation by comparing the measured exhaust temperature to the target exhaust temperature;
    compare the exhaust temperature deviation to a threshold;
    adjust at least one of a diesel injection start of injection, a rail pressure, an intake throttle, a wastegate, a compressor bypass valve, an exhaust throttle, a variable geometry turbocharger and engine valve timing when the exhaust temperature deviation exceeds the threshold to control charge-flow to the engine; and
    repeatedly adjust until the exhaust temperature deviation is less than the threshold.

8. The system of claim 7, wherein the processor is configured to access a lookup table including predetermined associations between target exhaust temperatures and at least one of current engine power and current engine speed.

9. The system of claim 7 and further comprising a dual fuel engine with at least two banks of cylinders controlled by the system.

10. The dual fuel engine of claim 9, wherein the engine includes a first bank of cylinders and a second bank of cylinders, and the system is configured to separately adjust controlling charge-flow to each of the banks of cylinders to balance operation of the banks of cylinders.

11. The dual fuel engine of claim 10, wherein the system is configured to lower a first flow of the gaseous fuel to one of the first and the second banks while increasing a second flow of the gaseous fuel to the other of the first and the second banks by a similar amount to maintain a substantially constant total gaseous fuel flow to the engine.

12. The dual fuel engine of claim 9, wherein the processor is part of an engine control module.

13. The dual fuel engine of claim 9, further comprising a variable geometry turbocharger.

14. The system of claim 7, wherein the sensor is a virtual sensor.

* * * * *